(12) United States Patent
Jacobsen et al.

(10) Patent No.: US 12,069,648 B2
(45) Date of Patent: Aug. 20, 2024

(54) ONE-STEP DATA TRANSMISSION IN TELECOMMUNICATION SYSTEMS

(71) Applicant: Nokia Technologies Oy, Espoo (FI)

(72) Inventors: Thomas Haaning Jacobsen, Norresundby (DK); Benny Vejlgaard, Gistrup (DK); Nuno Manuel Kiilerich Pratas, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 378 days.

(21) Appl. No.: 17/767,570

(22) PCT Filed: Oct. 11, 2019

(86) PCT No.: PCT/EP2019/077639
§ 371 (c)(1),
(2) Date: Apr. 8, 2022

(87) PCT Pub. No.: WO2021/069083
PCT Pub. Date: Apr. 15, 2021

(65) Prior Publication Data
US 2023/0096627 A1 Mar. 30, 2023

(51) Int. Cl.
*H04W 72/1268* (2023.01)
*H04W 56/00* (2009.01)

(52) U.S. Cl.
CPC ... *H04W 72/1268* (2013.01); *H04W 56/0015* (2013.01)

(58) Field of Classification Search
None
See application file for complete search history.

(56) References Cited

U.S. PATENT DOCUMENTS 10,701,702 B2 * 6/2020 Shih ............... H04W 72/21
12,004,153 B2 * 6/2024 Medina Acosta ..................
H04W 72/1268

(Continued)

FOREIGN PATENT DOCUMENTS

EP         3457804 A1    3/2019
WO    2021069083 A1    4/2021

*Primary Examiner* — Anh Vu H Ly
(74) *Attorney, Agent, or Firm* — Robert P. Michal, Esq.; Carter, DeLuca & Farrell LLP

(57) ABSTRACT

The present disclosure relates generally to the field of wireless communications, and in particular to techniques for performing one-step data transmissions from a User Equipment (UE) to a Base Station (BS), without requiring the UE to transit from an idle state to a connected state in a wireless communication network. To make it possible to perform the one-step data transmission, the UE receives a confirmation from the BS that the BS supports the one-step data transmission (which means that the BS has allocated, in advance, the UL resources for performing the one-step data transmission), and to have a pre-stored database associating cell IDs of different cells with corresponding pre-allocated UL resources and transmission parameters. Said confirmation from the BS may be represented by a predefined signal sequence, the presence of which will inform the UE about the possibility of performing the one-step data transmission within a cell of interest. After receiving the predefined signal sequence, the UE uses the pre-stored database to find the UL resources and transmission parameters used for the one-step data transmission from the idle state within the cell of interest.

20 Claims, 7 Drawing Sheets

(56) References Cited

U.S. PATENT DOCUMENTS

| | | | |
|---|---|---|---|
| 12,004,204 B2* | 6/2024 | Shin | H04W 56/0045 |
| 2018/0288746 A1 | 10/2018 | Zhang et al. | |
| 2019/0229843 A1 | 7/2019 | Yoshimoto et al. | |
| 2021/0168894 A1* | 6/2021 | Sha | H04L 5/0053 |
| 2021/0345372 A1* | 11/2021 | Li | H04W 48/12 |
| 2022/0038997 A1* | 2/2022 | Höglund | H04W 48/06 |
| 2022/0295381 A1* | 9/2022 | Höglund | H04W 72/23 |

* cited by examiner

| Cell_ID | PRB offset (from SSB) [PRB] | Symbol offset (from SSB ending) [symbols] | Periodicity [symbols] | MCS | Max TBS [bits] | Length [symbols] | BW [PRB] |
|---|---|---|---|---|---|---|---|
| 1 | -10 | 7 | 14 | QPSK1/2 | 32 | 4 | 1 |
| 2 | -9 | 14 | 7 | QPSK1/2 | 64 | 4 | 2 |
| ... | ... | ... | ... | ... | ... | ... | ... |
| N | -10 | 4 | 140 | QPSK1/8 | 64 | 8 | 2 |

ONE-STEP DATA TRANSMISSION IN TELECOMMUNICATION SYSTEMS

CROSS-REFERENCE TO RELATED APPLICATION

This application is the National Stage of, and therefore claims the benefit of, International Application No. PCT/EP2019/077639 filed on Oct. 11, 2019, entitled "ONE-STEP DATA TRANSMISSION IN TELECOMMUNICATION SYSTEMS," which was published in English under International Publication Number WO 2021/069083 on Apr. 15, 2021. The above application is commonly assigned with this National Stage application and incorporated herein by reference in its entirety.

TECHNICAL FIELD

The present disclosure relates generally to the field of wireless communications, and in particular to techniques for performing one-step data transmissions from an idle state of a User Equipment (UE) to a Base Station (BS) in a wireless communication network.

BACKGROUND

Small uplink (UL) data transmissions in the context of the 5th generation (5G) New Radio (NR) communication technology (or even in other cellular communication technologies developed by the 3GPP) are currently unfeasible for UEs with restricted power sources, such as energy harvesting devices. The main problem for this is that an initial connection establishment procedure (i.e. the process of monitoring a Synchronization Signal Block (SSB) periodically sent from a Base Station (BS), and decoding a Primary Synchronization Signal (PSS), a Secondary Synchronization Signal (SSS) and a Physical Broadcast Channel (PBCH) all constituting the SSB) requires a UE to be actively listening for a significant amount of time. For example, a Master Information Block (MIB) carried by the PBCH in the 5G NR is transmitted every 80 ms. Moreover, the UE has to dedicate significant processing resources to decode the contents of the MIB itself and a subsequent System Information Block(s) (SIB(s)) also transmitted over the PBCH.

SUMMARY

This summary is provided to introduce a selection of concepts in a simplified form that are further described below in the detailed description. This summary is not intended to identify key features or essential features of the present disclosure, nor is it intended to be used to limit the scope of the present disclosure.

It is an object of the present disclosure to provide a technical solution that allows one-step data transmissions from the idle state of the UE.

The object above is achieved by the features of the independent claims in the appended claims. Further embodiments and examples are apparent from the dependent claims, the detailed description and the accompanying drawings.

According to a first aspect, a user equipment (UE) is provided. The UE comprises a first receiver configured to receive a predefined signal sequence sent by a base station (BS) serving a cell within which the UE is present. The predefined signal sequence is indicative of support for one-step data transmission from an idle state of the UE within the cell. The UE further comprises a second receiver configured to receive a synchronization signal from the BS. The synchronization signal comprises a cell identifier (ID). The UE further comprises at least one processor configured to retrieve the cell ID from the synchronization signal and identify uplink (UL) resources and transmission parameters for the one-step data transmission by using a pre-stored database. The pre-stored database associates cell IDs of different cells with corresponding pre-allocated UL resources and transmission parameters for the one-step data transmission. The UE further comprises for a transmitter configured to perform the one-step data transmission from the idle state of the UE based on the identified UL resources and transmission parameters. This example embodiment allows the UE with the restricted power source to gain fast uplink access from its idle state to perform the small data transmission in one step and then to go back to sleep, thereby significantly reducing the activity time of the UE and saving its power. Moreover, this example embodiment does not require the UE to be subscribed to a particular network operator, meaning that any UE configured in the above-described manner can perform the one-step data transmission in any network carrier if that network carrier supports the one-step data transmission (which is indicated by using the predefined signal sequence).

In one further example embodiment of the first aspect, the synchronization signal comprises a synchronization signal block (SSB). The SSB comprises a primary synchronization signal (PSS), a secondary synchronization signal (SSS) and a physical broadcast channel (PBCH). In this example embodiment, the at least one processor is configured to retrieve the cell ID from the SSB by decoding the PSS and SSS. This makes it possible for the UE to perform the one-step data transmission in various existing wireless communication networks, such as Long-Term Evolution (LTE) and 5G NR systems.

In one further example embodiment of the first aspect, the predefined signal sequence further comprises an instruction for updating the pre-stored database. In this example embodiment, the at least one processor is further configured to retrieve updates to the pre-stored database by decoding the PBCH. This may allow the UE to be properly informed of any changes in the UL resources and transmission parameters used for the one-step data transmission within the cell of interest.

In one further example embodiment of the first aspect, the predefined signal sequence further comprises an instruction for receiving downlink (DL) data from the BS after the one-step data transmission. In this example embodiment, at least one of the first and second receivers is further configured to stay on to receive the DL data. This may allow the UE to be properly informed of any DL data to be received.

In one further example embodiment of the first aspect, the transmitter is further configured to send, in the one-step data transmission, information that at least one of the first and second receivers will stay on for a predefined amount of time after the one-step data transmission to receive to the DL data. This may allow the UE to avoid unnecessary power consumption in case if the BS fails to send the DL data after the one-step data transmission.

In one further example embodiment of the first aspect, the pre-stored database is implemented as a look-up table comprising a time offset, frequency offset, bandwidth as the UL resources and a maximum transport block size (TBS), modulation and coding scheme (MCS) index, symbol periodicity and UE transmission power as the transmission parameters for each cell ID. This example embodiment may provide more efficient searching for the UL resources and transmission parameters in the database.

According to a second aspect, a base station (BS) is provided. The BS comprises a first transmitter configured to send a predefined signal sequence to a user equipment (UE) present within a cell served by the BS. The predefined signal sequence is indicative of support for one-step data transmission from an idle state of the UE within the cell by using pre-allocated uplink (UL) resources and transmission parameters. The uplink (UL) resources and transmission parameters are indicated in a database pre-stored on the UE. The database associates cell IDs of different cells with corresponding pre-allocated UL resources and transmission parameters for the one-step data transmission. The BS further comprises a second transmitter configured to send a synchronization signal to the UE. The synchronization signal comprises a cell identifier (ID) of the cell. The BS further comprises a receiver configured to receive the one-step data transmission from the idle state of the UE. This example embodiment allows the UE with the restricted power source to gain fast uplink access from its idle state to perform the small data transmission in one step and then to go back to sleep, thereby significantly reducing the activity time of the UE and saving its power. Moreover, this example embodiment does not require the UE to be subscribed to a particular network operator, meaning that any UE configured in the above-described manner can perform the one-step data transmission in any network carrier if that network carrier supports the one-step data transmission (which is indicated by using the predefined signal sequence).

In one further example embodiment of the second aspect, the second transmitter is configured to send the synchronization signal as a synchronization signal block (SSB). The SSB comprises a primary synchronization signal (PSS), a secondary synchronization signal (SSS) and a physical broadcast channel (PBCH), and wherein the PSS and SSS carry the cell ID encoded thereon. This makes it possible to perform the one-step data transmission in various existing wireless communication networks, such as Long-Term Evolution (LTE) and 5G NR systems.

In one further example embodiment of the second aspect, the first transmitter is further configured to incorporate an instruction for the UE to update the database into the predefined signal sequence, and the second transmitter is further configured to send encoded updates to the database over the PBCH. This may allow the BS to properly inform the UE of any changes in the UL resources and transmission parameters used for the one-step data transmission.

In one further example embodiment of the second aspect, the first transmitter is further configured to incorporate an instruction for the UE to receive downlink (DL) data after the one-step data transmission into the predefined signal sequence, and at least one of the first and second transmitters is further configured to send the DL data after the one-step data transmission. This may allow the BS to efficiently deliver desired DL data to the UE without delay.

In one further example embodiment of the second aspect, the one-step data transmission received from the UE comprises information that the UE will stay on fora predefined amount of time after the one-step data transmission to receive to the DL data. In this example embodiment, at least one of the first and second transmitters is configured to send the DL data to the UE during the predefined amount of time. This may allow the UE to avoid unnecessary power consumption in case if the first and second transmitters both fail to send the DL data after the one-step data transmission.

In one further example embodiment of the second aspect, the first and second transmitters are implemented as a single transmitter, and the single transmitter is configured to append the predefined signal sequence to the synchronization signal. This may allow the BS to communicate the predefined signal sequence and the synchronization signal to the UE in one transmission, thereby additionally reducing the activity time of the UE.

According to a third aspect, a method is provided. The method comprises the operation of receiving, at a user equipment (UE), a predefined signal sequence sent by a base station (BS) serving a cell within which the UE is present. The predefined signal sequence is indicative of support for one-step data transmission from an idle state of the UE within the cell. The method further comprises the operation of receiving, at the UE, a synchronization signal from the BS. The synchronization signal comprises a cell identifier (ID). The method further comprises the operations of retrieving, at the UE, the cell ID from the synchronization signal, and identifying, at the UE, uplink (UL) resources and transmission parameters for the one-step data transmission by using a pre-stored database. The pre-stored database associates cell IDs of different cells with corresponding pre-allocated UL resources and transmission parameters for the one-step data transmission. The method further comprises the operation of performing the one-step data transmission from the idle state of the UE based on the identified UL resources and transmission parameters. This example embodiment allows the UE with the restricted power source to gain fast uplink access from its idle state to perform the small data transmission in one step and then to go back to sleep, thereby significantly reducing the activity time of the UE and saving its power. Moreover, this example embodiment does not require the UE to be subscribed to a particular network operator, meaning that any UE configured in the above-described manner can perform the one-step data transmission in any network carrier if that network carrier supports the one-step data transmission (which is indicated by using the predefined signal sequence). Other example embodiments of the method according to the third aspect are similar to the example embodiments of the UE according to the first aspect.

According to a fourth aspect, a method is provided. The method comprises the operation of sending, from a base station (BS), a predefined signal sequence to a user equipment (UE) present within a cell served by the BS. The predefined signal sequence is indicative of support for one-step data transmission from an idle state of the UE within the cell by using pre-allocated uplink (UL) resources and transmission parameters. The uplink (UL) resources and transmission parameters are indicated in a database pre-stored on the UE. The database associates cell IDs of different cells with corresponding pre-allocated UL resources and transmission parameters for the one-step data transmission. The method further comprises the operation of sending, from the BS, a synchronization signal to the UE. The synchronization signal comprises a cell identifier (ID). The method further comprises the operation of receiving, at the BS, the one-step data transmission from the idle state of the UE. This example embodiment allows the UE with the restricted power source to gain fast uplink access from its idle state to perform the small data transmission in one step and then to go back to sleep, thereby significantly reducing the activity time of the UE and saving its power. Moreover, this example embodiment does not require the UE to be subscribed to a particular network operator, meaning that any UE configured in the above-described manner can perform the one-step data transmission in any network carrier if that network carrier supports the one-step data transmission (which is indicated by using the predefined signal sequence). Other example embodiments of the method according to the fourth aspect are similar to the example embodiments of the BS according to the second aspect.

According to a fifth aspect, a computer program product is provided, which comprises a computer-readable medium having a computer program stored thereon. The computer program, when executed by at least one processor, causes the at least one processor to perform the method according to the third aspect of the present disclosure. This may allow the method according to the third aspect of the present disclosure to be more flexible in use.

According to a sixth aspect, a computer program product is provided, which comprises a computer-readable medium having a computer program stored thereon. The computer program, when executed by at least one processor, causes the at least one processor to perform the method according to the fourth aspect of the present disclosure. This may allow the method according to the fourth aspect of the present disclosure to be more flexible in use.

Other features and advantages of the present disclosure will be apparent upon reading the following detailed description and reviewing the accompanying drawings.

BRIEF DESCRIPTION OF THE DRAWINGS

The essence of the present disclosure is explained below with reference to the accompanying drawings in which:

FIG. 2 illustrates a database used by the UE shown in FIG. 1 and implemented as a look-up table in accordance with one example embodiment;

DETAILED DESCRIPTION

Figure 1:
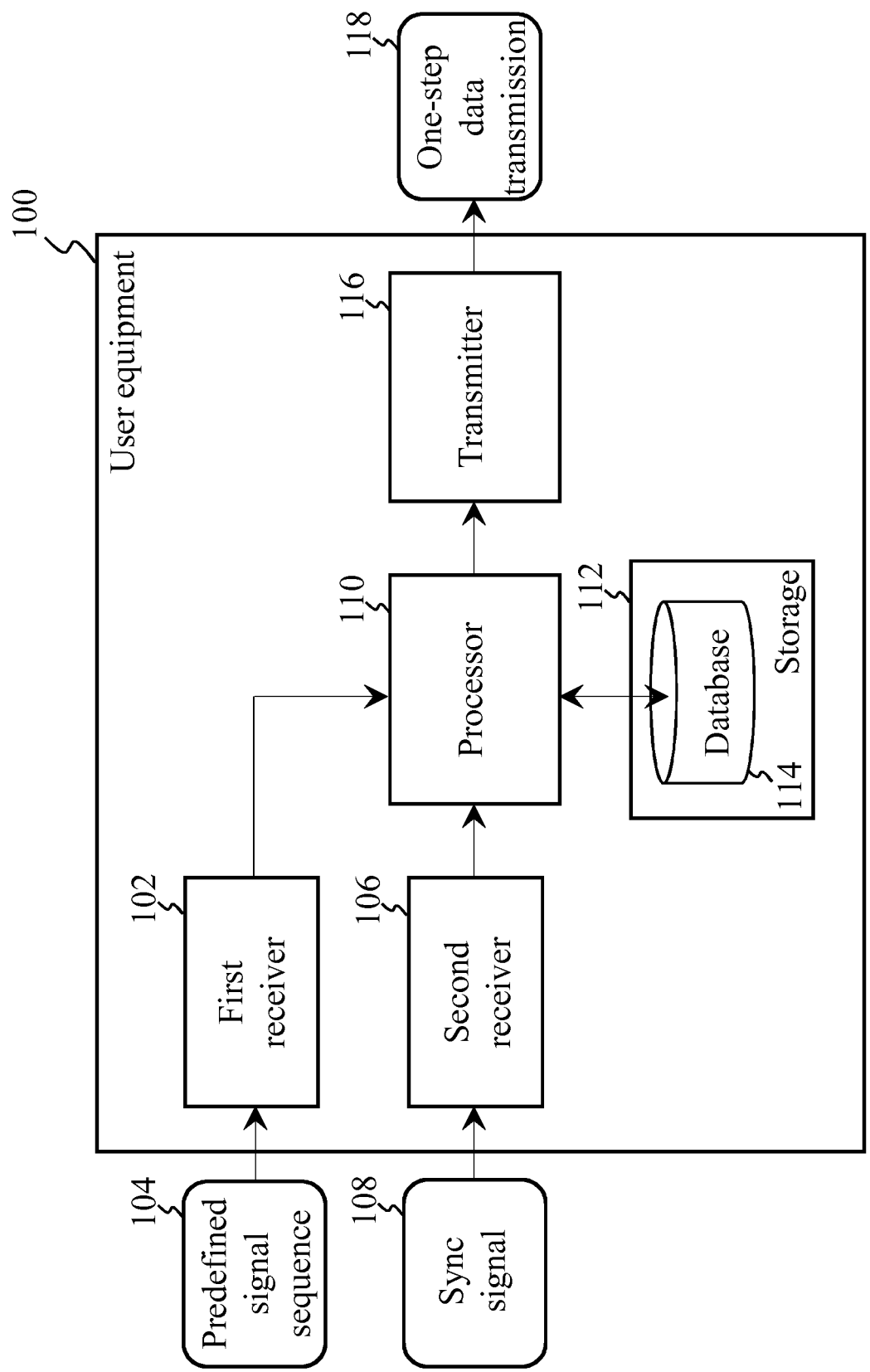
FIG. 1 shows a block-scheme of a UE capable of performing the one-step data transmissions within a cell of interest in accordance with one example embodiment.

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatuses and methods disclosed herein can be implemented in practice by using any numbers of the embodiments provided herein. Furthermore, it should be understood that any embodiment of the present disclosure can be implemented using one or more of the elements presented in the appended claims.

The word "example" is used herein in the meaning of "used as an illustration". Unless otherwise stated, any embodiment described herein as "example" should not be construed as preferable or having an advantage over other embodiments.

According to an example embodiment, a user equipment or UE for short may refer to a mobile device, a mobile station, a terminal, a subscriber unit, a mobile phone, a cellular phone, a smart phone, a cordless phone, a personal digital assistant (PDA), a wireless communication device, a laptop computer, a tablet computer, a gaming device, a netbook, a smartbook, an ultrabook, a medical device or medical equipment, a biometric sensor, a wearable device (for example, a smart watch, smart glasses, a smart wrist band), an entertainment device (for example, an audio player, a video player, etc.), a vehicular component or sensor, a smart meter/sensor, industrial manufacturing equipment, a global positioning system (GPS) device, an Internet-of-Things (IoT) device, a machine-type communication (MTC) device, a group of Massive IoT (MIoT) or Massive MTC (mMTC) devices/sensors, or any other suitable device configured to support wireless communications.

According to an example embodiment, a base station or BS for short may relate to a fixed point of communication for UEs in a particular carrier network. The BS may be referred to as a base transceiver station (BTS) in terms of the 2G communication technology, a NodeB in terms of the 3G communication technology, an evolved NodeB (eNodeB) in terms of the 4G communication technology, and a gNB in terms of the 5G NR communication technology. The BS may be implemented as a basic service set (BSS) representing a set of all base stations communicating with each other, or an extended service set (ESS) representing a set of connected BSSs. The BS may serve different cells, such as a macrocell, a microcell, a picocell, a femtocell, and/or other types of cells. The macrocell may cover a relatively large geographic area (for example, at least several kilometers in radius). The microcell may cover a geographic area less than two kilometers in radius, for example. The picocell may cover a relatively small geographic area, such, for example, as offices, shopping malls, train stations, stock exchanges, etc. The femtocell may cover an even smaller geographic area (for example, a home). Correspondingly, the BS serving the macrocell may be referred to as a macro BS, the BS serving the microcell may be referred to as a micro BS, and so on.

According to example embodiment, an idle state may refer to a state where a UE reduces power consumption by sleeping most of the time. In the LTE and 5G NR systems, the idle state is defined in accordance with a Radio Resource Control (RRC) protocol, for which reason the idle state is called RRC_IDLE. The idle state means that the UE has no connection with a certain BS serving a cell within which the UE is present. This allows the UE to have the lowest energy consumption.

If the UE has data to transmit, the UE needs to establish connection with the BS by transitioning from the idle state to a connected state in accordance with one of the existing communication technologies. Let us now describe this process in terms of the RRC protocol applied to the 5G NR. To change its state from the RRC_IDLE to RRC_CONNECTED, the UE should start searching for active carriers and the location of the SSB sent by the BS. The UE is forced to attempt all feasible carriers and sub-carrier-spacings (SCS). When the SSB is found, the UE decodes it to provide frequency synchronization and a rough time resolution. However, the UE will not have accurate time-alignment due to unknown propagation delays. The SSBs are transmitted per beam (half frame long, transmitted every second frame) and can be configured to be transmitted per bandwidth part. The SSB consists of the PSS, the SSS, and the PBCH. By decoding the PSS and the SSS, the UE retrieves a cell ID of the cell served by the BS. By decoding the PBCH, the UE retrieves the MIB/SIB. The MIB may provide required information on where to identify a Physical Downlink Control Channel (PDCCH) carrying a System Information Block Type 1 (SIB1). The SIB1 provides information on UL and DL channels and a Random Access Channel (RACH). The RACH is needed to acquire the remaining SIBs. The UE then conducts a RACH procedure, establish an RRC connection (i.e. transits to RRC_CONNECTED), establish a Non-access stratum (NAS) context, and eventually receive UL resources through a dynamic grant. The UL resources are then used to perform UL data transmission.

However, the above-described process of performing the UL data transmission using the RACH procedure is not suitable for the UEs with restricted power sources because it requires the UEs to stay on for a long period of time to receive all the above-mentioned necessary information from the BS, including the UL resources to be used for the UL data transmission.

To reduce unnecessary transitions from RRC_IDLE to RRC_CONNECTED, there has been introduced a third RRC state, RRC_INACTIVE, in the 5G NR (see Rel-15). In the inactive state, the UE can sleep in a similar manner as in the idle state, but an RRC context and a core network connection are maintained. This means that the transition from the RRC_INACTIVE to RRC_CONNECTED can be handled much faster than the transition from the RRC_IDLE to RRC_CONNECTED. In the meantime, the inactive state allows for the so-called small UL data transmissions from the UE. The term "small UL data transmission" may refer to a feature where the UE in RRC_INACTIVE can transmit small UL data without necessarily performing the full transition to RRC_CONNECTED. However, these small UL data transmissions from RRC_INACTIVE still rely on the RACH procedure.

An example embodiment provides a technical solution that allows mitigating or even eliminating the above-sounded drawbacks peculiar to the prior art. In particular, the technical solution disclosed herein allows the UE to gain fast UL access from the idle state of the UE to perform the small data transmission in one operation, i.e. without requiring any UL resource grant from the BS. In other words, the technical solution disclosed herein does not require the UE to use the RACH procedure. The grant-free small data transmission performed in one step from the idle state of the UE is hereinafter referred to as one-step data transmission for convenience. To make it possible to perform the one-step data transmission, the UE needs to receive a confirmation from the BS that the BS supports the one-step data transmission (which means that the BS has allocated, in advance, the UL resources for performing the one-step data transmission), and to have a pre-stored database associating cell IDs of different cells with corresponding pre-allocated UL resources and transmission parameters. Said confirmation from the BS may be represented by a predefined signal sequence, the presence of which will inform the UE about the possibility of performing the one-step data transmission within a cell of interest. The UE is aware of the predefined signal sequence in advance. For example, the UE may be pre-configured to store the predefined signal sequence and compare it to the one received from the BS to make sure that the one-step data transmission from the idle state of the UE is allowed within the cell of interest. Alternatively, the UE may be aware of the predefined signal sequence based on standard specifications applied to the UE. After receiving the predefined signal sequence, the UE uses the pre-stored database to find the UL resources and transmission parameters used for the one-step data transmission from the idle state within the cell of interest.

FIG. 1 shows a block-scheme of a UE 100 capable of performing the one-step data transmissions within a cell of interest in accordance with one example embodiment. The UE 100 comprises the following constructive elements: a first receiver 102 configured to receive a predefined signal sequence 104 sent from a BS (not shown in FIG. 1) serving the cell; a second receiver 106 configured to receive a synchronization signal 108 comprising a cell ID from the BS; a processor 110 configured to retrieve the cell ID from the synchronization signal 108 and to identify UL resources and transmission (TX) parameters; a storage 112 storing a database 114; and a transmitter 116 configured to perform one-step data transmission 118 to the BS. It should be noted that the number, arrangement and intercommunication of the constructive elements constituting the UE 100, which are shown in FIG. 1, are not intended to be construed as any limitation of the present disclosure, but merely used to provide a general idea of how the constructive elements may be implemented within the UE 100 to enable the one-step data transmission 118. In one other example embodiment, the first receiver 102 and the second receiver 106 may be implemented as a single receiver, like the ones used in the modern mobile devices. In yet another example embodiment, the first receiver 102, the second receiver 106 and the transmitter 116 may be implemented as a single transceiver, like the ones used in the modern mobile devices.

The processor 110 may be implemented as a central processing unit (CPU), general-purpose processor, single-purpose processor, microcontroller, microprocessor, application specific integrated circuit (ASIC), field programmable gate array (FPGA), digital signal processor (DSP), complex programmable logic device, etc. It should be also noted that the processor 110 may be implemented as any combination of one or more of the aforesaid. As an example, the processor may be a combination of two or more microprocessors.

The storage 112 may be implemented as a nonvolatile or volatile memory used in the modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The database 114 is configured to store cell IDs of different cells with corresponding pre-allocated UL resources and TX parameters intended for the one-step data transmission 118. The database 114 may be automatically loaded to the storage 112 of the UE 100 during its initial connection (i.e. RRC_CONNECTED) to a wireless communications network, such as a cellular network, for example; subsequently, the UE 100 may use the database 114 for the purpose of performing the one-step data transmission 118 from RRC_IDLE. The database 114 may be structured in a tabular form (for example, a look-up table). In one example embodiment, the tabular database 114 is constructed such that each row corresponds to a certain cell ID and each column corresponds to certain UL resources and TX parameters associated with this cell ID. In one other example embodiment, the tabular database 114 may be configured as a set of tables, with each table being associated with a certain cell ID. At the same time, the processor 110 may be configured to query and maintain the database 114 by using any suitable programming language, for example, Structured Query Language (SQL).

FIG. 2 illustrates the database 114 implemented as a look-up table 200 in accordance with one example embodiment. In the look-up table 200, a Physical Resource Block (PRB) or absolute frequency offset from an SSB center frequency, a symbol or absolute time offset from the SSB, and a bandwidth constitute the UL resources, while a maximum Transport Block Size (TBS), a Modulation and Coding Scheme (MCS) index, a symbol periodicity and length constitute the TX parameters for each cell ID. It should be noted that the UL resources and TX parameters shown in the look-up table 200 are not the exclusively possible, and they may be excluded, replaced or supplemented with any other UL resources and TX parameters, if required. For example, the TX parameters may also comprise UE transmission power required for performing the one-step data transmission 118.

In one example embodiment, the synchronization signal 108 comprises the SSB comprising the PSS, the SSS and the PBCH. In this example embodiment, the processor 110 is configured to retrieve the cell ID from the SSB by decoding the PSS and SSS.

One example embodiment is possible, in which the predefined signal sequence 104 further comprises an instruction for updating the database 114. In this example embodiment, the processor 110 may be further configured to retrieve updates to the database 114 by decoding the PBCH. Then, the processor 110 may be further configured to provide the retrieved updates to the database 114 for its updating.

In one example embodiment, the predefined signal sequence 104 further comprises an instruction for the UE 100 to receive additional DL data from the BS after the one-step data transmission 118 is completed. To provide this receipt, at least one of the first and second receivers 102, 106 may be further configured to stay on after the one-step data transmission 118 is completed.

Figure 3:
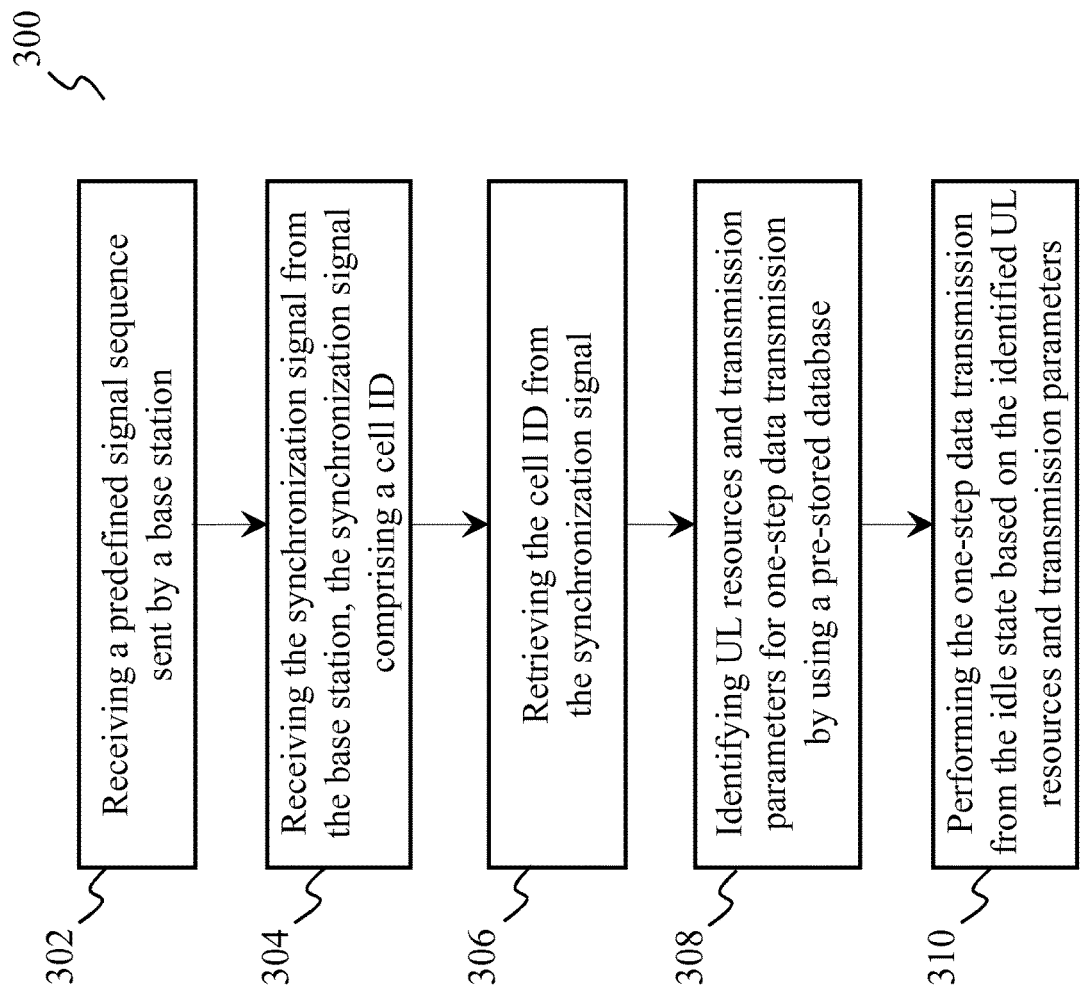
FIG. 3 shows a flowchart of a method for operating the UE shown in FIG. 1 within the cell of interest in accordance with one example embodiment.

FIG. 3 shows a flowchart of a method 300 for operating the UE 100 within the cell of interest in accordance with one example embodiment. Each of the operations of the method 300 is performed by corresponding one of the above-described constructive elements constituting the UE 100. The method 300 starts with an operation 302, in which the predefined signal sequence 104 sent by the BS is received at the UE 100. The receipt of the predefined signal sequence 104 implies that the one-step data transmission 118 from the idle state of the UE 100 is allowed within the cell. In other words, the presence of the predefined signal sequence 104 means that there are available UL resources reserved by the BS for the one-step data transmission 118. The BS may use different examples of the predefined signal sequence 104, such as an m-sequence, a Zadoff-Chu sequence, a pre-known sequence of unmodulated symbols, or different shifts of a given signal sequence, to encode the support for the one-step data transmission 118. Further, the method proceeds to an operation 304, in which the synchronization signal 108 is received at the UE 100 from the BS, the synchronization signal comprising the cell ID. The operations 302 and 304 may be combined into a single operation, provided that the predefined signal sequence 104 and the synchronization signal 108 have been sent together (for example, the predefined signal sequence 104 has been appended to the SSB at the BS). Next, an operation 306 is initiated, in which the UE 100 retrieves the cell ID from the synchronization signal 108. After that, the method 300 proceeds to an operation 308, in which the UE 100 identifies the UL resources and TX parameters for the one-step data transmission 118 by referring to the pre-stored database 114. The method 300 ends up with an operation 310, in which the UE 100 performs the one-step data transmission 118 from the idle state based on the identified UL resources and TX parameters.

Figure 4:
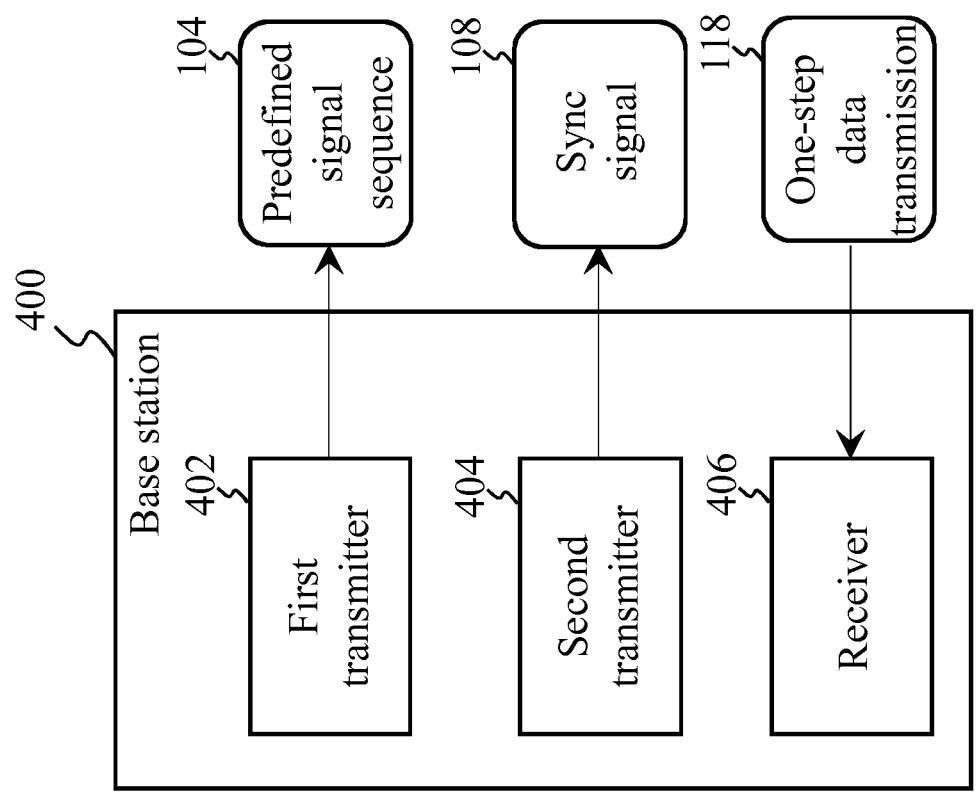
FIG. 4 shows a block-scheme of a BS capable of supporting the one-step data transmission from the UE 100 shown in FIG. 1 within the cell of interest in accordance with one example embodiment.

FIG. 4 shows a block-scheme of a BS 400 capable of supporting the one-step data transmission 118 from the UE 100 within the cell of interest in accordance with one example embodiment. The BS 400 comprises the following constructive elements: a first transmitter 402 configured to send the predefined signal sequence 104 to the UE 100; a second transmitter 404 configured to send the synchronization signal 108 to the UE 100; and a receiver 406 configured to receive the one-step data transmission 118 from the idle state of the UE 100. Again, the number and arrangement of the constructive elements constituting the BS 400, which are shown in FIG. 4, are not intended to be the only possible, but merely used to provide a general idea of how the constructive elements may be implemented within the BS 400 to facilitate support for the one-step data transmission 118 from the idle state of the UE 100. In one other example embodiment, the first transmitter 402 and the second transmitter 404 may be implemented as a single transmitter, like the ones used in the modern mobile devices. In yet another example embodiment, the first transmitter 402, the second transmitter 404 and the receiver 406 may be implemented as a single transceiver, like the ones used in the modern mobile devices.

In one example embodiment, the second transmitter 404 may be configured to send the synchronization signal 108 as the SSB. As discussed earlier, the SSB comprises the PSS, the SSS and the PBCH. By so doing, the BS 400 requires the UE 100 (in particular, the processor 110) to be configured to retrieve the cell ID from the SSB by decoding the PSS and SSS.

In one example embodiment, the first transmitter 402 is further configured to incorporate an instruction for the UE 100 to update the database 114 into the predefined signal sequence 104. Thus, the BS 400 may promptly inform the UE 100 about all changes in the UL resources and TX parameters to be used to perform the one-step data transmission 118 within the cell of interest. The second transmitter 404 may, in turn, be configured to encode and send the updates themselves over the PBCH.

One example embodiment is possible, in which the first transmitter 402 is further configured to incorporate an instruction for the UE 100 to receive additional DL data after the one-step data transmission 118 is completed. The DL data themselves may then be sent by the first transmitter 402 or the second transmitter 404.

Figure 5:
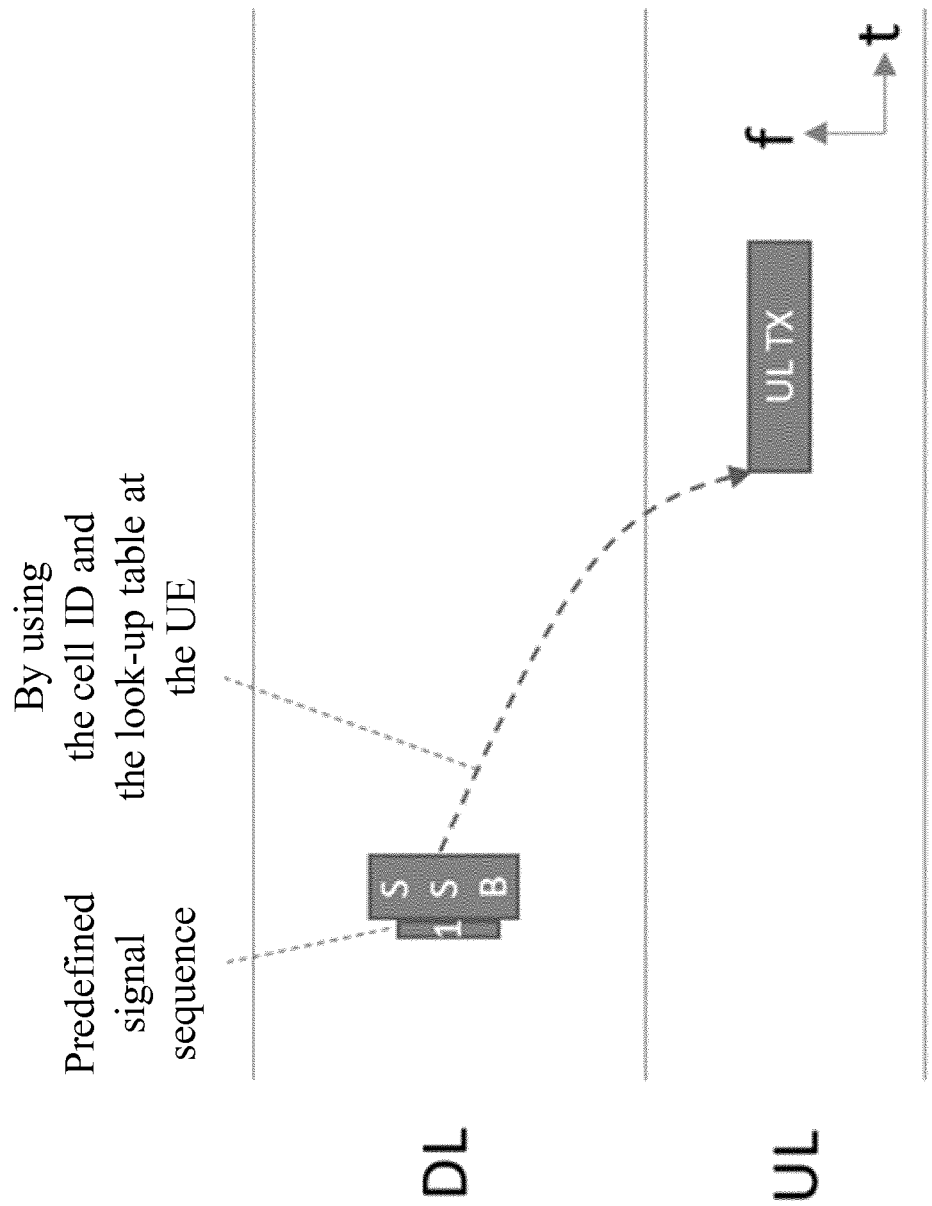
FIG. 5 shows a mapping from the SSB to UL resources by using a cell ID and the look-up table shown in FIG. 2.

If the first and second transmitters 402, 404 are combined into a single transmitter, the single transmitter may be configured to append the predefined signal sequence 104 to the synchronization signal 108 and send them together to the UE 100, as schematically shown in FIG. 5. More specifically, FIG. 5 shows a mapping from the synchronization signal 108 represented by the SSB to the UL resources by using the cell ID and the look-up table (which is one example embodiment of the database 114) at the UE 100 (i.e. by the processor 112). The digit "1" indicated inside the block denoting the SSB means that the predefined signal sequence 104 may take or carry at least one value (for example, a shift option for m-sequences constituting the PSS) indicating that the one-step data transmission 118 is supported within the cell served by the BS 400. At the same time, the indication that the one-step data transmission 118 is supported within the cell of interest may be expressed as any other value(s) depending on particular application.

Figure 6:
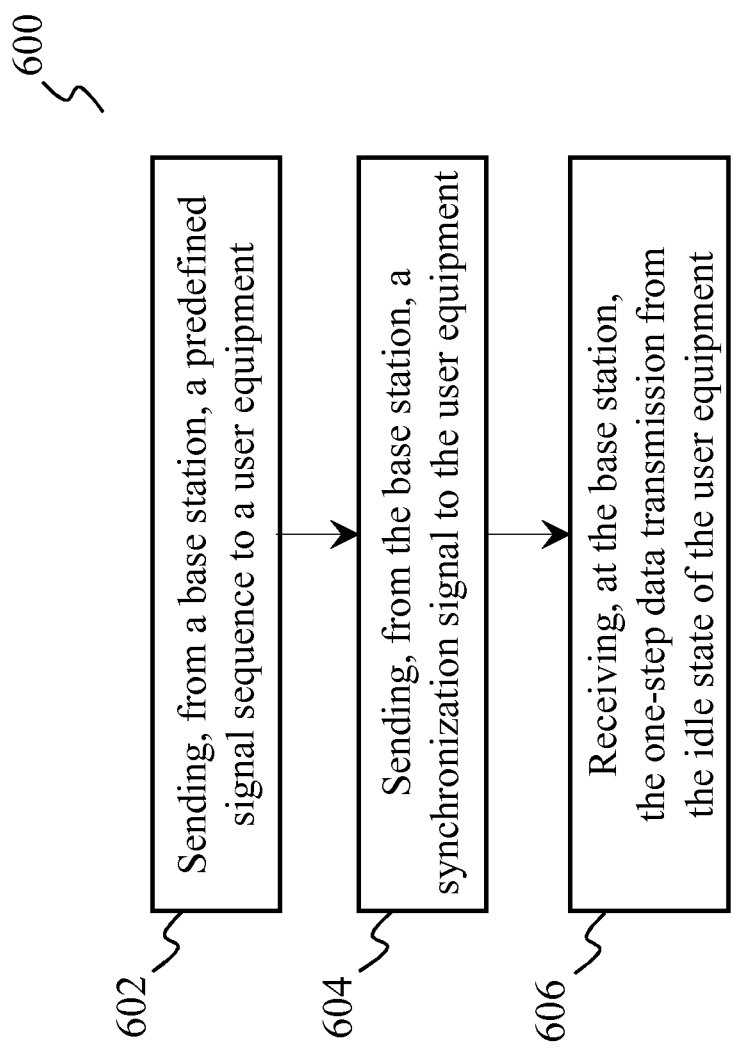
FIG. 6 shows a flowchart of a method for operating the BS shown in FIG. 4 in accordance with one example embodiment.

FIG. 6 shows a flowchart of a method 600 for operating the BS 400 in accordance with one example embodiment. Each of the operations of the method 600 is performed by corresponding one of the above-described constructive elements constituting the BS 400. The method 600 starts with an operation 602, in which the predefined signal sequence 104 is sent from the BS 400 to the UE 100 present within the cell served by the BS 400. As discussed earlier, the predefined signal sequence 104 is a confirmation that the UE 100 may perform the one-step data transmission 118 from the idle state of the UE 100. In other words, by receiving the predefined signal sequence 104 from the BS 400, the UE 100 assures that the BS 400 has pre-reserved certain UL resources for the one-step data transmission 118. The BS 400 may use different examples of the predefined signal sequence 104, such as an m-sequence, a Zadoff-Chu sequence, a pre-known sequence of unmodulated symbols, or different shifts of a given signal sequence, to encode the support for the one-step data transmission 118. Further, the method 600 proceeds to an operation 604, in which the synchronization signal 108 is sent from the BS 400 to the UE 100, the synchronization signal 108 comprising the cell ID. The operations 602 and 604 may be combined into a single operation, provided that the predefined signal sequence 104 and the synchronization signal 108 are sent together (for example, the predefined signal sequence 104 is appended to the SSB at the BS 400). The method 600 ends up with an operation 606, in which the BS 400 receives the one-step data transmission 118 performed from the idle state of the UE 100.

Figure 7:
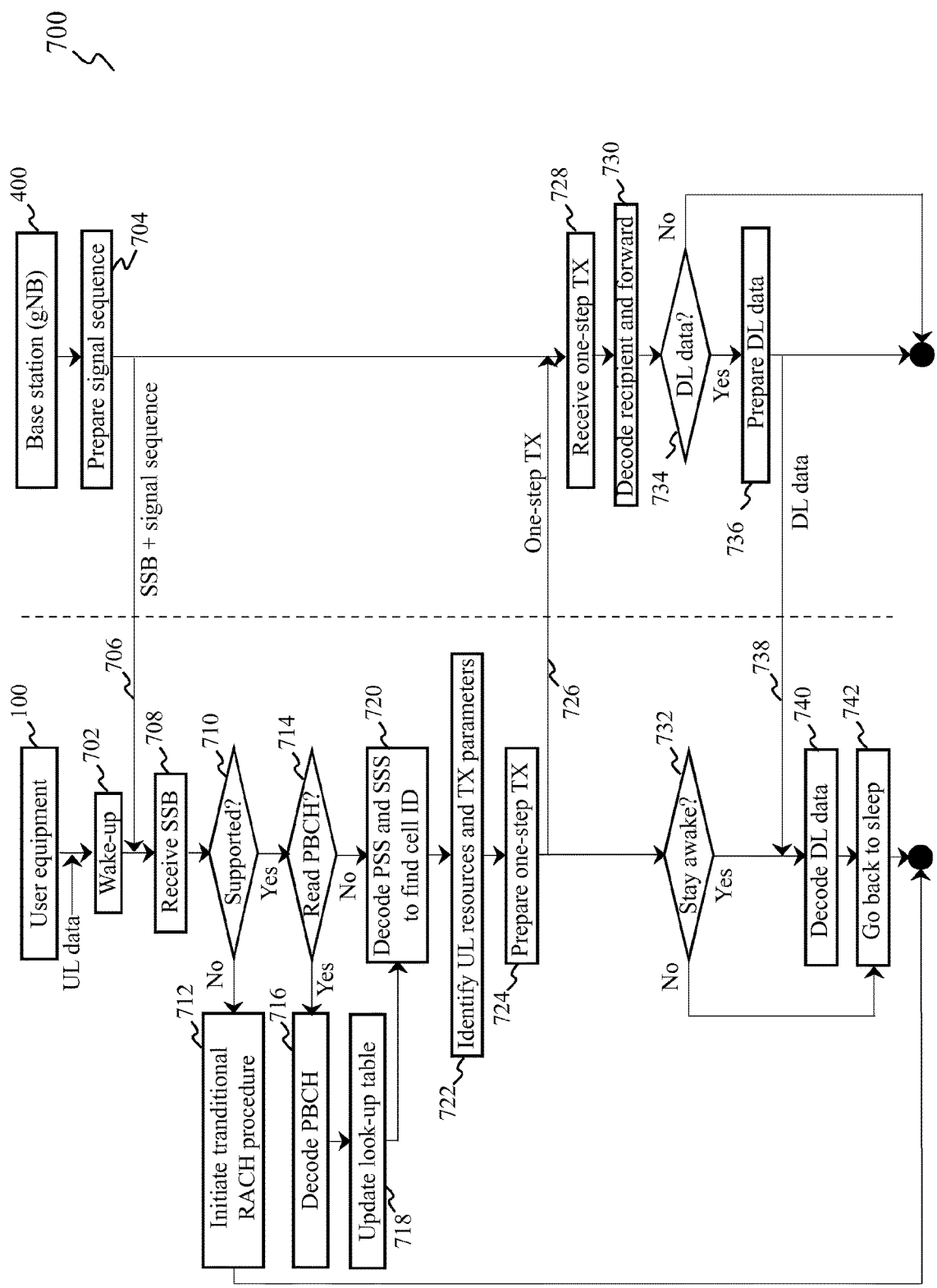
FIG. 7 shows an interaction diagram that details how the one-step data transmission is performed from the idle state of the UE shown in FIG. 1 to the BS shown in FIG. 4 in the 5G NR.

FIG. 7 shows an interaction diagram 700 that details how the one-step data transmission 118 may be performed from the idle state of the UE 100 to the BS 400 in the 5G NR (for which reason the BS 400 is referred to as the gNB in FIG. 7). The whole interaction process is initiated when the UE 100 has small UL data to be transmitted. At first, in an operation 702, the UE 100 wakes up from deep sleep and starts searching for the predefined signal sequence 104 prepared by the BS 400 in an operation 704 and periodically sent together with the SSB to the UE 100 in an operation 706. In an operation 708, the UE 100 receives the SSB from the BS 400, and checks, in an operation 710, whether the predefined signal sequence 104 is appended to the SSB. If the predefined signal sequence 104 is absent (see "No" in the operation 710), the UE 100 determines that the one-step data transmission 118 from the idle state is unsupported by the BS 400, and initiates the standard RACH procedure to transmit the UL data in an operation 712. If the predefined signal sequence 104 is present (see "Yes" in the operation 710), the UE 100 determines that the one-step data transmission 118 from the idle state is supported by the BS 400, which means that the BS 400 has pre-allocated the UL resources for doing that.

Further, in an operation 714, the UE 100 checks whether the predefined signal sequence 104 further comprises an instruction to read the PBCH included in the SSB prior to performing the one-step data transmission 118. As discussed earlier, the BS 400 may inform the UE 100 about any changes in the UL resources pre-allocated for the one-step data transmission 118 by encoding and sending corresponding updates to the look-up table (which is one example embodiment of the database 114) over the PBCH. Therefore, if the predefined signal sequence 104 comprises such an instruction (see "Yes" in the operation 714), the UE 100 decodes the PBCH to retrieve the updates to the look-up table in an operation 716, and then updates the look-up table in an operation 718. Irrespective of whether there is "Yes" or "No" in the operation 714, the UE 100 further proceeds to an operation 720.

In the operation 720, the UE 100 decodes the PSS and SSS included in the SSB to retrieve the cell ID of the cell served by the BS 400. Then, in an operation 722, the UE 100 uses the retrieved cell ID to identify the UL resources and TX parameters for the one-step data transmission 118 in the look-up table pre-stored in the UE 100. Next, the UE 100 prepares (for example, encodes, modulates, etc.) payload for the one-step data transmission 118 in an operation 724 and performs the one-step data transmission 118 itself in an operation 726. The payload may comprise, along with the UL data, information that the UE 100 is waiting for a DL response from the BS 400, or any other extra DL information from the BS 400, or even information that the UE 100 will stay awake for a predefined amount of time after the one-step data transmission 118 is completed in order to listen to any eventual DL feedback from the BS 400. It is assumed that the UL data are self-contained in the sense that they comprise all necessary information about a destination. In an operation 728, the BS 400 receives the one-step data transmission 118 from the UE 100. Then, the BS 400 decodes the one-step data transmission 118 to retrieve the UL data and the information about the destination and forward the UL data to the destination in an operation 730.

As shown in FIG. 7, the interaction diagram 700 may not end in the operation 730 if the predefined signal sequence 104 further comprises the instruction for the UE 100 to receive the additional DL data after the one-step data transmission 118 is completed. The presence of this instruction is checked by the UE 100 in an operation 732. In other words, the UE 100 determines whether it should stay awake to receive the DL data from the BS 400. If this is the case (see "Yes" in the operation 732), the UE 100 does not go back to sleep but is in a waiting state for a predefined period of time (which may also be indicated in the predefined signal sequence, in addition to the instruction). In turn, the BS 400 checks, in an operation 734, whether there are still the DL data intended for the UE 100. If the DL data are present (see "Yes" in the operation 734), the BS 400 prepares (for example, properly encodes, modulates) them for transmission in an operation 736 and perform their transmission to the UE 100 in an operation 738. The UE 100 receives and decodes the DL data in an operation 740, whereafter the UE 100 goes back to sleep in an operation 742. If the DL data are absent (see "No" in the operation 734), it means an end of the interaction between the BS 400 and the UE 100, i.e. the UE 100 will go back to sleep after the expiry of the predefined period of time with no DL data being received.

It should apparent that some of the operations constituting the interaction diagram 700 are optional, i.e. may be excluded from the interaction diagram 700. For example, if the predefined signal sequence 104 does not comprise any of the above-indicated instructions for the UE 100, the operations 716, 718, 732-740 should be omitted.

It should be noted that each block or operation of the methods 300, 600 and the interaction diagram 700, or any combinations of the blocks or operations, can be implemented by various means, such as hardware, firmware, and/or software. As an example, one or more of the blocks or operations described above can be embodied by processor executable instructions, data structures, program modules, and other suitable data representations. Furthermore, the processor executable instructions which embody the blocks or operations described above can be stored on a corresponding data carrier and executed by at least one processor implementing functions of one or more of the constructive elements of the UE 100 or the BS 400, respectively. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the exemplary embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or operations, and the indefinite article "a" or "an" does not exclude a plurality. The mere fact that certain measures are recited in mutually different dependent claims does not indicate that a combination of these measures cannot be used to advantage.

The invention claimed is:

1. A user equipment (UE) comprising:
   a first receiver configured for a predefined signal sequence sent by a base station (BS) serving a cell within which the UE is present, the predefined signal sequence being indicative of support for one-step data transmission from an idle state of the UE within the cell;
   a second receiver configured for a synchronization signal from the BS, the synchronization signal comprising a cell identifier (ID);
   at least one processor configured to:
      retrieve the cell ID from the synchronization signal;
      identify uplink (UL) resources and transmission parameters for the one-step data transmission by using a pre-stored database, the pre-stored database associating cell IDs of different cells with corresponding pre-allocated UL resources and transmission parameters for the one-step data transmission; and
   a transmitter configured to perform the one-step data transmission from the idle state of the UE to the BS based on the identified uplink resources and transmission parameters.

2. The UE of claim 1, wherein the synchronization signal comprises a synchronization signal block (SSB), the SSB comprising a primary synchronization signal (PSS), a secondary synchronization signal (SSS) and a physical broadcast channel (PBCH), and wherein the at least one processor is configured to retrieve the cell ID from the SSB by decoding the PSS and SSS.

3. The UE of claim 2, wherein the predefined signal sequence further comprises an instruction for updating the pre-stored database, and wherein the at least one processor is further configured to retrieve updates to the pre-stored database by decoding the PBCH.

4. The UE of claim 2, wherein the predefined signal sequence further comprises an instruction for receiving downlink (DL) data from the BS after the one-step data transmission, and at least one of the first and second receivers is further configured to stay on to receive the DL data.

5. The UE of claim 4, wherein the transmitter is further configured to send, in the one-step data transmission, information that at least one of the first and second receivers will stay on for a predefined amount of time after the one-step data transmission to receive to the DL data.

6. The UE of claim 1, wherein the pre-stored database is implemented as a look-up table, and wherein the look-up table comprises a time offset, frequency offset, bandwidth as the UL resources and a maximum transport block size (TBS), modulation and coding scheme (MCS) index, symbol periodicity and UE transmission power as the transmission parameters for each cell ID.

7. A base station (BS) comprising:
   a first transmitter configured to send a predefined signal sequence to a user equipment (UE) present within a cell served by the BS, the predefined signal sequence being indicative of support for one-step data transmission from an idle state of the UE within the cell by using pre-allocated uplink (UL) resources and transmission parameters, the uplink (UL) resources and transmission parameters being indicated in a database pre-stored on the UE, and the database associating cell IDs of different cells with corresponding pre-allocated UL resources and transmission parameters for the one-step data transmission;
   a second transmitter configured to send a synchronization signal to the UE, the synchronization signal comprising a cell identifier (ID); and
   a receiver configured for the one-step data transmission from the idle state of the UE.

8. The BS of claim 7, wherein the second transmitter is configured to send the synchronization signal as a synchronization signal block (SSB), the SSB comprising a primary synchronization signal (PSS), a secondary synchronization signal (SSS) and a physical broadcast channel (PBCH), and wherein the PSS and SSS have the cell ID encoded thereon.

9. The BS of claim 8, wherein the first transmitter is further configured to incorporate an instruction for the UE to update the database into the predefined signal sequence, and wherein the second transmitter is further configured to send encoded updates to the database over the PBCH.

10. The BS of claim 7, wherein the first transmitter is further configured to incorporate, into the predefined signal sequence, an instruction for the UE to stay awake to receive downlink (DL) data after the one-step data transmission, and at least one of the first and second transmitters is further configured to send the DL data after the one-step data transmission.

11. The BS of claim 10, wherein the one-step data transmission comprises information that the UE will stay on for a predefined amount of time after the one-step data transmission to receive to the DL data, and at least one of the first and second transmitters is configured to send the DL data to the UE during the predefined amount of time.

12. The BS of claim 7, wherein the first and second transmitters are implemented as a single transmitter, and the single transmitter is configured to append the predefined signal sequence to the synchronization signal.

13. A method comprising:
sending, from a base station (BS), a predefined signal sequence to a user equipment (UE) present within a cell served by the BS, the predefined signal sequence being indicative of support for one-step data transmission from an idle state of the UE within the cell by using pre-allocated uplink (UL) resources and transmission parameters, the uplink (UL) resources and transmission parameters being indicated in a database pre-stored on the UE, and the database associating cell IDs of different cells with corresponding pre-allocated UL resources and transmission parameters for the one-step data transmission;
sending, from the BS, a synchronization signal to the UE, the synchronization signal comprising a cell identifier (ID); and
receiving, at the BS, the one-step data transmission from the idle state of the UE.

14. The method of claim 13, wherein said sending the synchronization signal comprises sending a synchronization signal block (SSB), the SSB comprising a primary synchronization signal (PSS), a secondary synchronization signal (SSS) and a physical broadcast channel (PBCH), and wherein the PSS and SSS have the cell ID encoded thereon.

15. The method of claim 14, wherein the predefined signal sequence further comprises an instruction for the UE to update the database, and wherein said sending the synchronization signal further comprises sending encoded updates to the database over the PBCH.

16. The method of claim 13, wherein the predefined signal sequence further comprises an instruction for the UE to receive downlink (DL) data after the one-step data transmission, and wherein the method further comprises sending the DL data after the one-step data transmission.

17. The method of claim 16, wherein the one-step data transmission comprises information that the UE will stay on for a predefined amount of time after the one-step data transmission to receive to the DL data, and wherein said sending the DL data comprises sending the DL data to the UE during the predefined amount of time.

18. The method of claim 13, wherein said sending the predefined signal sequence and said sending the synchronization signal are combined into one operation of sending a combination of the predefined signal sequence and the synchronization signal.

19. A computer program product comprising a non-transitory computer-readable medium, the computer-readable medium having a computer program stored thereon, wherein the computer program, when executed by at least one processor, causes the at least one processor to perform the method of claim 13.

20. The BS of claim 10, wherein the first and second transmitters are implemented as a single transmitter, and the single transmitter is configured to append the predefined signal sequence to the synchronization signal.

* * * * *